United States Patent [19]
Wilson

[11] Patent Number: 6,072,650
[45] Date of Patent: Jun. 6, 2000

[54] DATA PLACEMENT VARIATION COMPENSATION SYSTEM

[75] Inventor: Aaron Wade Wilson, Berthoud, Colo.

[73] Assignee: STMicroelectronics N.V., Netherlands

[21] Appl. No.: 08/939,063

[22] Filed: Sep. 29, 1997

[51] Int. Cl.$^7$ ........................................... G11B 5/09
[52] U.S. Cl. .............................. 360/51; 360/48
[58] Field of Search .................... 360/51, 31, 48

[56] References Cited

U.S. PATENT DOCUMENTS

| | | | |
|---|---|---|---|
| 5,267,098 | 11/1993 | Lokhoff | 360/50 |
| 5,812,335 | 9/1998 | Kool et al. | 360/51 |

*Primary Examiner*—Alan Faber
*Attorney, Agent, or Firm*—Theodore E. Galanthay; Lisa K. Jorgenson; William J. Kubida

[57] ABSTRACT

The invention comprises a magnetic disk storage system and comprises method for configuring the magnetic disk storage system. The magnetic disk storage system facilitates write and read operations that compensate for variances that are experienced with magnetic disk storage systems. When writing data to a data sector, the magnetic disk storage system utilizes a phase lock oscillator field that has a length that is specified for that data sector. When reading from a data sector, the magnetic disk storage system utilizes an incremental read delay that has a duration that is specified for that data sector. Data sectors with shorter data sector delay periods can have shorter phase lock oscillator fields than data sectors with larger data sector delay periods. This frees-up memory space and increases the capacity and performance of the magnetic disk storage system.

25 Claims, 4 Drawing Sheets

DATA PLACEMENT VARIATION COMPENSATION SYSTEM

FIELD OF THE INVENTION

This invention relates to the field of magnetic disk storage systems, and in particular, to magnetic disk storage systems that compensate for system variances and optimize system capacity and performance when writing and reading data.

PROBLEM

In a typical magnetic disk storage system, a read/write head is positioned over a disk to write data to a data sector on the disk as the disk spins under the read/write head. When the data is subsequently read, the read/write head must be re-positioned over the data sector. However, magnetic disk storage systems experience variances that make finding the precise location of a data sector difficult. Current systems waste disk space when accurately locating data sectors. This invention minimizes the wasted disk space used to locate data sectors.

A conventional magnetic disk device is comprised of multiple magnetic disks and is partitioned as follows. A cylinder refers to a set of circular tracks that generally reside at the same radius from the center of the magnetic disks. A particular side of a disk is referred to as a platter surface and is identified by a read/write head number. A circular track around the platter surface can be identified by a head number and a cylinder number. The track has timing references that are numbered and spaced at regular intervals. In a system with multiple disks, a particular timing reference can be found by using a read/write head number, a cylinder number, and a timing reference number.

A timing technique is used to locate data sectors near the timing reference. The time period that it takes for the disk to spin under the read/write head from the timing reference to the data sector is referred to as a "data sector delay period". Each data sector has an associated data sector delay period. Data sectors that are further from the timing reference have longer data sector delay periods.

When access to the data sector is desired, the proximate timing reference is located using the read/write head number, cylinder number, and timing reference number. After detection of the timing reference, the elapsed time is monitored as the data sector spins toward the read/write head. When the data sector delay period has elapsed, the beginning of the desired data sector should be positioned under the read/write head.

When data is written to a data sector, the read/write head number, cylinder number, timing reference number for that data sector are stored. The data sector delay period for the data sector is also stored. When the data is read, the system uses the read/write head number, cylinder number, and timing reference number to position the timing reference under the read/write head. After the timing reference is detected, the elapsed time is monitored as the disk spins. When the data sector delay period has elapsed, the read/write head should be properly positioned to begin reading the data.

Magnetic disk storage systems contain phase lock oscillator fields in each data sector. A phase lock oscillator field contains a reference signal that is detected at the beginning of each data sector when the data is read. The magnetic disk storage system does not read data from a data sector unless it first detects the reference signal in the phase lock oscillator field. If the phase lock oscillator field is missed, the system must wait until the disk is re-positioned to detect the reference signal. This results in slower data access.

A splice transient appears at the beginning of each phase lock oscillator field as a result of the write operation. It is desirable to delay reading the phase lock oscillator field until after the splice transient has passed under the read/write head. As a result, an additional time delay is added to the data sector delay period before data is read. This additional time delay is referred to as an "incremental read delay". One example of incremental read delay is a read gate delay. Incremental read delays are also designed to account for variances experienced by magnetic disk storage systems. System variances can cause the disk to be positioned differently when data is read as opposed to when that data was written. Data sector delay periods and incremental read delays are illustrated on FIG. 3.

The duration of the incremental read delay and the length of the phase lock oscillator field are related. The incremental read delay is designed to skip the splice transient and account for system variances. The phase lock oscillator field must be long enough so that the reference signal remains after the incremental read delay has passed. As a result, a longer incremental read delay requires a longer phase lock oscillator field.

The length of the phase lock oscillator field is identical for all of the data sectors used in a transfer to the magnetic disk device. In addition, the duration of the incremental read delay is identical for all of the data sectors used in a transfer from the magnetic disk device. This causes a problem because the phase lock oscillator field and the incremental read delay and may be too long for many of the data sectors. This wastes memory space since the read/write head continues to read the phase lock oscillator field after the reference signal has been detected. There is a distinct need for a magnetic disk storage system that can utilize incremental read delays and phase lock oscillator fields that are sized appropriately for each data sector.

SOLUTION

The invention provides for fast and reliable read operations by compensating for variances that are experienced with magnetic disk storage systems. The invention significantly reduces the wasted memory space that is caused by compensation techniques that are applied uniformly to all data sectors. The invention utilizes incremental read delays and/or phase lock oscillator fields that are sized appropriately for a given data sector.

The invention is a magnetic disk storage system and a method for configuring the magnetic disk storage system. When writing data to a data sector, the magnetic disk storage system utilizes a phase lock oscillator field that has a length that is specified for that data sector. When reading from a data sector, the magnetic disk storage system utilizes an incremental read delay that has a duration that is specified for that data sector. The phase lock oscillator field and the incremental read delay are specified based on the data sector delay period. Importantly, this allows the phase lock oscillator field and incremental read delay to be tailored to each data sector. Valuable memory space can be freed-up if the phase lock oscillator field can be shortened.

The magnetic disk storage system also accounts for system variances. Typically, these variances are larger for a data sector that is farther away from the timing reference. The distance from the timing reference to the data sector can be measured by the data sector delay period. This means that data sectors with shorter data sector delay periods can have shorter phase lock oscillator fields and shorter incremental read delays than data sectors with larger data sector delay periods.

In some embodiments, the magnetic disk storage system is configured with a control means and a writing means. The control means specifies the length of a phase lock oscillator field for a data sector based on the data sector delay period for the data sector. The writing means writes a set of data to the data sector that includes the phase lock oscillator field. The phase lock oscillator field has the length specified by the control means.

It should be noted that the length of the phase lock oscillation field is specified for the data sector based on the data sector delay period. This allows the length of the phase lock oscillation field to be shortened in data sectors that are closer to the timing reference. This frees-up valuable memory space.

In some embodiments, the magnetic disk storage system is also configured with a reading means. The control means specifies the duration of the incremental read delay for the data sector based on the data sector delay period for the data sector. The reading means reads the set of data from the data sector after the incremental read delay plus the data sector delay period. The incremental read delay has the duration specified by the control means.

The data sector delay period is a time period from when the system detects the timing reference on the magnetic disk device until when the magnetic disk device is positioned to write to the data sector. One example of a timing reference is a servo timing mark. Servo timing marks are known in the art and they are typically contained in a servo field. The system repeatedly detects the timing reference as the magnetic disk device spins around. As a result, those skilled in the art can appreciate that a data sector delay period can start after any recurring detection of the timing reference.

In various embodiments, the control means can be incorporated into a hard disk controller of the magnetic disk storage system. The control means could also be implemented with a logic circuit that is provided with the appropriate inputs. The control means could comprise a memory that associates a data sector with information that incorporates the incremental read delay duration and/or the phase lock oscillator field length for that data sector.

Such a memory could be comprised of registers, a first-in/first-out memory, or be located on the magnetic disk device.

DETAILED DESCRIPTION

Figure 1:
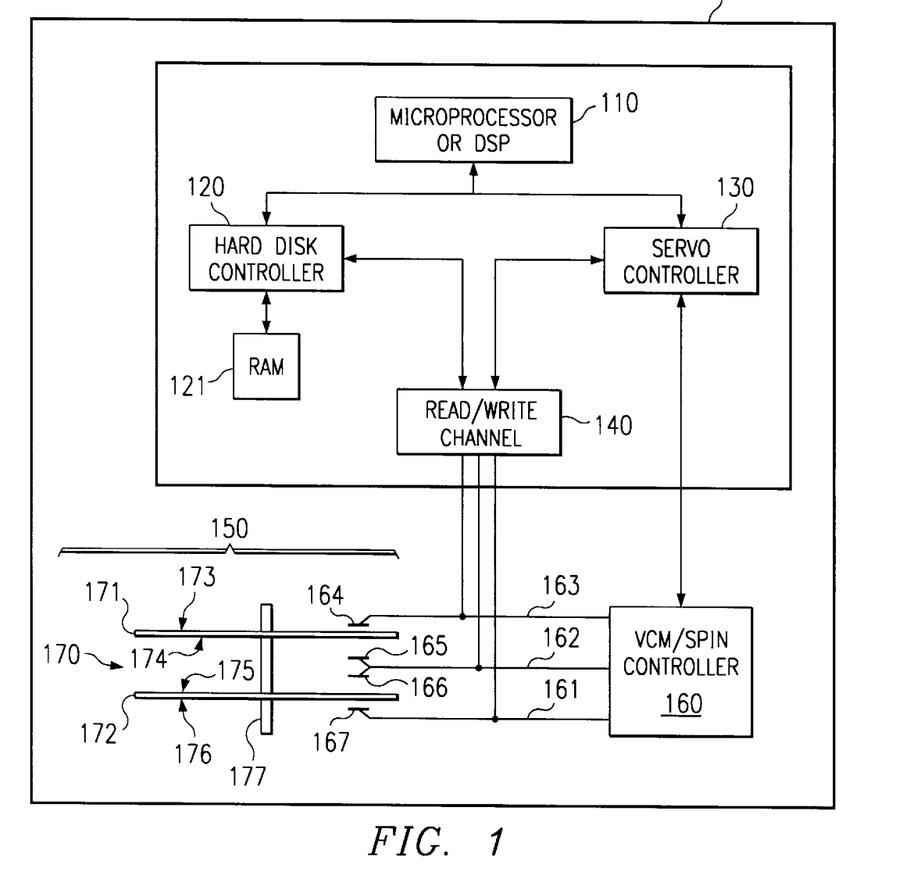
FIG. 1 illustrates an example of a system level view of a magnetic disk storage system architecture in block diagram form.

Magnetic Disk Storage System Architecture—FIG. 1

FIG. 1 illustrates a system level architecture view of a magnetic disk storage system 100 in block diagram form. The primary components of magnetic disk storage system 100 include, but are not limited to, disk control components 110–140 and operational disk components 150–160. Disk control components 110–140 include, but are not limited to, a microprocessor or Digital Signal Processor (DSP) 110, a Hard Disk Controller (HDC) 120 with accompanying RAM 121, a servo controller 130, and a read/write channel controller 140. The microprocessor or DSP 110 is the highest level of control and coordination for all disk device activities and read/write operations executed by the disk control components. HDC 120 manages and caches all data being written to and/or read from the magnetic disk 170. RAM 121 is used as a data cache in addition to table storage for disk related information such as split data sector information and/or defective data sector information as is done in conventional magnetic disk devices. The servo controller 130 interprets servo field information and controls positioning activities of read/write heads. Read/write channel 140 passes data between the operational disk components 150–160 and the disk control components 110–130 for each read/write operation.

Operational disk components 150–160 include, but are not limited to, a Read/write head and Disk Assembly (HDA) 150 that includes magnetic disk 170 and read/write heads 164–167, a Voice Coil Motor (VCM)/spin controller 160 that is operatively connected to access arms 161–163 through a voice coil motor (not shown apart from VCM/spin controller 160). Magnetic disk 170 is comprised of one or more platters 171–172. Each platter has at least one and typically two magnetic recording surfaces as illustrated for the first and second surfaces 173–174 and 175–176 of platters 171–172 respectively. Each of the platters 171–172 of a multiple platter magnetic disk 170 are rigidly fixed to a spindle 177 along a common central axis. VCM/spin controller 160 manages the appropriate physical movements of the access arms 161–163. VCM/spin controller 160 also manages the movement of spindle 177. The read/write heads 164–167 are positioned to either fly just off the recording surfaces 173–167 respectively or to drag on the recording surfaces respectively when the magnetic disk 170 is spinning. Although other magnetic disk device architectures are possible other than the architecture described above, no limitation is intended or implied with respect to the present invention. The present invention is applicable to any memory disk system regardless of: magnetic, optical or other format; single platter or multiple platter implementation; removable medium or floppy disk medium; or numerous other variations that can be appreciated by those skilled in the art.

The present invention could be implemented within magnetic disk storage system 100 using any processing capability or memory within the system. Alternatively, an external processor or memory could be provided to control the magnetic disk storage system 100 in accord with the invention. Preferably, the HDC 120 would be configured with a logic circuit to implement the present invention. The logic circuit could be configured to add additional phase lock oscillator field length and/or incremental read delay duration as the data sector delay period increased. Alternatively, the HDC 120 or the RAM 121 could be configured with a memory that associates each data sector with information that incorporates the phase lock oscillator field length and/or the incremental read delay duration for that data sector. The memory could be accessed to control read/write operations.

Figure 2:
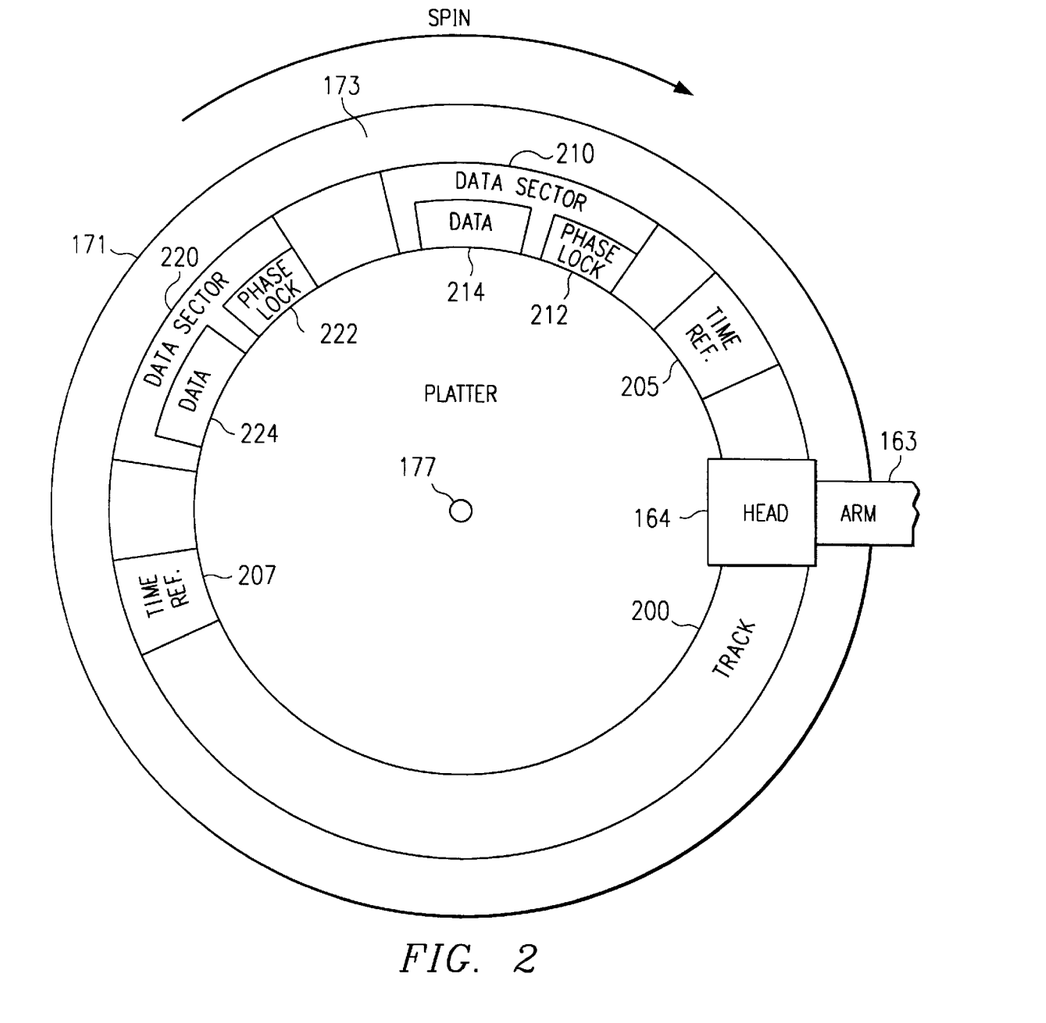
FIG. 2 illustrates an example of a disk format in block diagram form.

Disk Format—FIG. 2

FIG. 2 illustrates the format of a disk in a magnetic disk device. The following elements that are shown and described for FIG. 1 that are shown again on FIG. 2 include: disk 171, platter 173, read/write head 164, access arm 163, and spindle 177. Also shown on FIG. 2 is a track 200. The track 200 contains a timing reference 205, a data sector 210, a data sector 220, and a timing reference 207. The data sector 210 contains a phase lock oscillator field 212 and data 214. The data sector 220 contains a phase lock oscillator field 222 and data 224. One skilled in the art can recognize that additional formatting and information is typically resident on a disk, but these elements have been omitted for the sake of clarity. In addition, one skilled in the art can recognize many variations and equivalents to the elements illustrated on FIG. 2 that fall within the scope of the invention.

The track 200 is a circular storage area within a cylinder and around the surface of the platter 173. The timing references 205 and 207 are numbered and spaced at regular intervals. The timing references 205 and 207 are detected by the read/write head 164 to facilitate the position of the read/write head 164 relative to the disk 171. The timing references 205 and 207 can also facilitate the measurement of variances in the spin speed of the disk 171. A preferred timing reference is the servo timing mark contained within a servo field.

The data sector 210 is an area of the track 200 that stores information, such as the phase lock oscillator field 212 and the data 214. The magnetic disk storage system does not read the data 214 in the data sector 210 unless it first detects the reference signal in phase lock oscillator field 212. If the phase lock oscillator field 212 is missed, the system must wait until the disk 171 is correctly re-positioned under the read/write head 164 to detect the reference signal. A missed phase lock oscillator field results in slower data access. The data sector 220 is similar in these respects to the data sector 210.

The data sector delay period for the data sector 210 is the time that it takes to spin the disk 171 under the read/write head 164 from the timing reference 205 to the data sector 210. The data sector delay period for the data sector 220 is the time that it takes to spin the disk 171 under the read/write head 164 from the timing reference 205 to the data sector 220. The data sector delay period for the data sector 220 is longer than the data sector delay period for the data sector 210 because the data sector 220 is further from the timing reference 205 than the data sector 210. In the context of the invention, it is preferred to time the data sector delay period with a reference clock for the purpose of specifying phase lock oscillator field length or incremental read delay duration.

The incremental read delay for the data sector 210 is a time period that is added to the data sector delay period for the data sector 210 when the data sector 210 is read. The incremental read delay for the data sector 220 is a time period that is added to the data sector delay period for the data sector 220 when the data sector 220 is read. When one of the data sectors is read by the read/write head 164, magnetic disk storage system 100 allows a time period to pass that is equivalent to the data sector delay period for that data sector plus the incremental read delay for that data sector. The incremental read delay allows extra time for the data sector to spin under the read/write head 164. It also allows the read/write head to skip the splice transient at the beginning of the phase lock oscillation field when reading the data sector.

For a write operation to the data sector 210, the magnetic disk storage system 100 specifies length for the phase lock oscillator field 212 in the data sector 210. The length of the phase lock oscillator field 212 can be lengthened to ensure that the phase lock oscillator field 212 is positioned under the read/write head 164 at the beginning of a subsequent read operation given the incremental read delay for the data sector 210. The magnetic disk storage system 100 then writes the phase lock oscillator field 212 with the specified length and the data 214 to the data sector 210. The magnetic disk storage system 100 stores the numbers for the read/write head 164, the cylinder for the track 200, and the timing reference 205 for the data sector 210, and also stores the data sector delay period for the data sector 210.

For a read operation from the data sector 210, the magnetic disk storage system 100 specifies a duration for the incremental read delay for the data sector 210. The duration of the incremental read delay for the data sector 210 can be designed to account for system variances and to skip the splice transient at the beginning of the phase lock oscillator field 212. The magnetic disk storage system 100 uses the numbers for the read/write head 164, the cylinder for the track 200, and the timing reference 205 to position the timing reference 205 under the read/write head 164. After the magnetic disk storage system 100 detects the timing reference 205, it monitors the time until both the data sector delay period and the incremental read delay for the data sector 210 have elapsed. After that point, the phase lock oscillator field 212 should be correctly positioned under the read/write head 164 and the data sector 210 can be read.

For a write operation to the data sector 220, the magnetic disk storage system 100 specifies length for the phase lock oscillator field 222 in the data sector 220. The length of the phase lock oscillator field 222 can be lengthened to ensure that the phase lock oscillator field 222 is positioned under the read/write head 164 at the beginning of a subsequent read operation given the incremental read delay for the data sector 220. The magnetic disk storage system 100 then writes the phase lock oscillator field 222 with the specified length and the data 224 to the data sector 220. The magnetic disk storage system 100 stores the numbers for the read/write head 164, the cylinder for the track 200, and the timing reference 205 for the data sector 220, and also stores the data sector delay period for the data sector 220.

For a read operation from the data sector 220, the magnetic disk storage system 100 specifies a duration for the incremental read delay for the data sector 220. The duration of the incremental read delay for the data sector 220 can be designed to account for system variances and to skip the splice transient at the beginning of the phase lock oscillator field 222. The magnetic disk storage system 100 uses the numbers for the read/write head 164, the cylinder for the track 200, and the timing reference 205 to position the timing reference 205 under the read/write head 164. After the magnetic disk storage system 100 detects the timing reference 205, it monitors the time until both the data sector delay period and the incremental read delay for the data sector 220 have elapsed. After that point, the phase lock oscillator field 222 should be correctly positioned under the read/write head 164 and the data sector 220 can be read.

Figure 3:
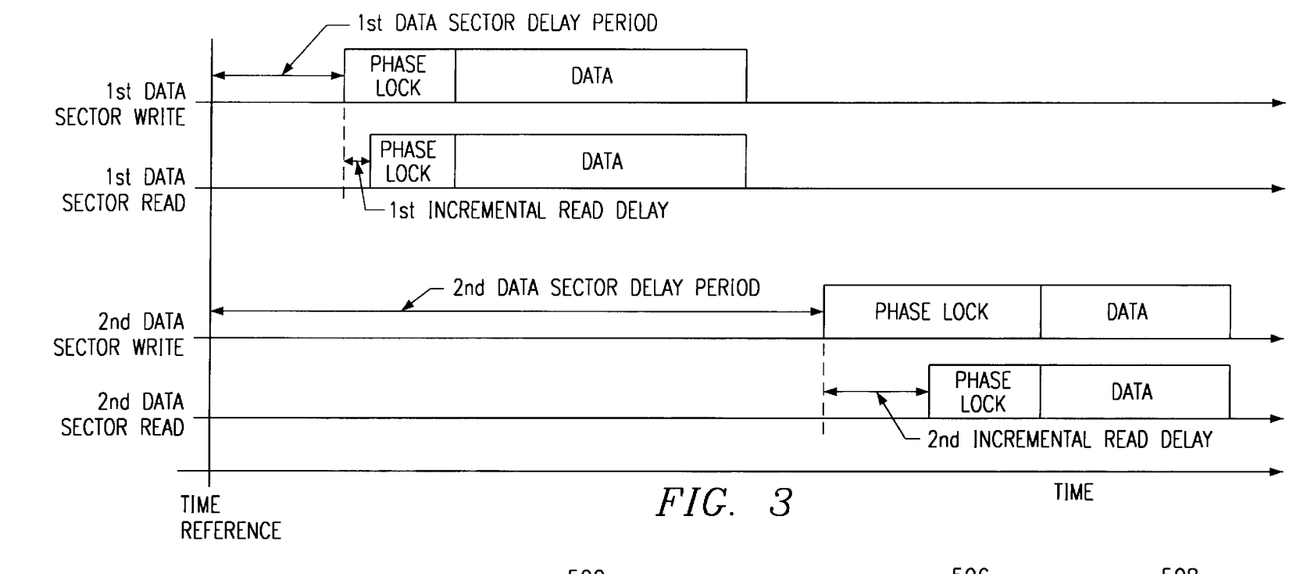
FIG. 3 illustrates write/read operation timing for use in some embodiments of the invention.

Write/Read Operation Timing—FIG. 3

FIG. 3 illustrates a timing diagram for write and read operations from different data sectors and illustrates the timing associated with a read/write operation. The magnetic disk storage system should account for system variances. Examples of system variances are variations in the spin speed, servo timing reference, and the timing clock of the system. A variance in the servo timing reference is a variation between the asynchronous timing reference and the phase of the synchronous timing clock. Typically, the variances in spin speed and timing clock frequency cause a larger variance for a data sector that is farther away from the timing reference. Distance from the timing reference to the data sector can be measured by the data sector delay period. This means that data sectors with shorter data sector delay periods can have shorter phase lock oscillator fields and shorter incremental read delays than data sectors with larger data sector delay periods. The shorter phase lock oscillator fields free-up valuable memory space, but the incremental read delay still compensates for system variances.

On FIG. 3, the horizontal axis represents the passage of time and the vertical axis represents an occurrence of the timing reference. Moving to the right on FIG. 3 represents increasing time after the timing reference. At the top of the diagram, a write operation for a first data sector is illustrated. The first data sector write operation begins after a first data sector delay period. A phase lock oscillator field with a length that is specified for the first data sector is written to the first data sector in addition to the data.

Directly below the first data sector write operation, a read operation for the first data sector is illustrated. The read operation begins after the first data sector delay period plus a first incremental read delay. The first incremental read delay is specified for the first data sector. Because of the incremental read delay, the entire phase lock oscillator field cannot be read, but enough can be read to allow phase lock. All of the data is read.

Directly below the first data sector read operation, a write operation for the second data sector is illustrated. The write operation begins after a second data sector delay period. A phase lock oscillator field with a length that is specified for the second data sector is written to the second data sector in addition to the data.

Directly below the second data sector write operation, a read operation for the second data sector is illustrated. The read operation begins after the second data sector delay period plus a second incremental read delay. The second incremental read delay is specified for the second data sector. Because of the incremental read delay, the entire phase lock oscillator field cannot be read, but enough can be read to allow phase lock. All of the data is read.

The magnetic disk storage system can specify the length of the phase lock oscillator field and the incremental read delay based on the associated data sector delay period. The first data sector delay period is shorter than the second data sector delay period. As a result, the length of the first phase lock oscillator field is shorter than the length of the second phase lock oscillator field. In addition, the duration of the first incremental read delay is shorter than the duration of the second incremental read delay. The shorter first phase lock oscillator field frees-up memory space in the first data sector, but the first incremental read delay still accounts for variances in the system.

In conventional magnetic disk storage systems, the first incremental read delay would be the same duration as the second incremental read delay during a transfer. This means that the first incremental read delay would be designed to account for the larger variances experienced by the second data sector. As a result, the first incremental read delay would be too long and unnecessarily lengthen first phase lock oscillator field.

In conventional magnetic disk storage systems, the first phase lock oscillator field would be the same length as the second phase lock oscillator field during a transfer. This means that the first phase lock oscillator field would be designed to account for the second incremental read delay. As a result, the first phase lock oscillator field would be too long and would waste memory space.

As illustrated on FIG. 3, the first phase lock oscillator field is shorter than the second phase lock oscillator field. This reduction in the phase lock oscillator field saves valuable memory space. Those skilled in the art can readily appreciate how the additional memory space can be used to increase the capacity or performance of the magnetic disk storage system. To increase capacity, the savings of memory space in multiple data sectors is used to add an additional data sector. To improve error rates, lower recording frequencies are used to lower bit density without lowering data capacity. The lower 10 recording frequencies can be used to set the zone boundaries of the disk to optimize capacity. The above techniques can be used in combination. Those skilled in the art can appreciate other ways to utilize the invention.

In the above embodiments, only two data sectors are shown after the timing reference. Those skilled in the art will appreciate that the invention is applicable to a single data sector or to numerous data sectors after the timing reference. The above embodiment illustrates that the invention utilizes a phase lock oscillation field length that is specific to the data sector being written. The above embodiment also illustrates that the invention utilizes an incremental read delay that is specific to the data sector being written.

Figure 4:
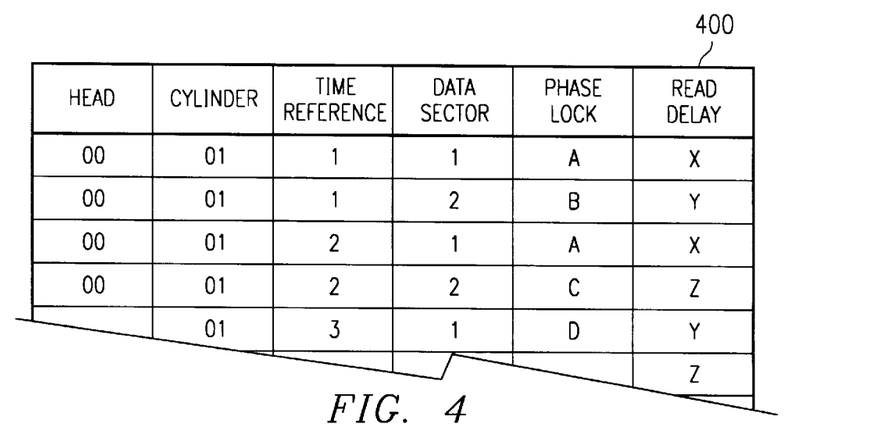
FIG. 4 illustrates a logical table for use in some embodiments of the invention.

A Memory Table Implementation—FIG. 4

FIG. 4 illustrates a logical table 400 that could be stored in a memory of the magnetic disk storage system and used to implement some embodiments of the invention. Shown are columns for read/write head number, cylinder number, time reference number, data sector, phase lock oscillator length, and incremental read time delay duration. The table could be implemented using registers or a first-in/first-out memory. The table could also be integrated into the hard disk controller or its associated RAM. The table could also be stored on the magnetic disk device.

The entries in the table are dummy values that are shown for illustrative purposes. Typically, the length of the phase lock oscillator field is measured in 8-bit bytes, and the duration of the incremental read delay is measured in micro-seconds. The proper entries in the table for the lengths of the phase lock oscillator fields or the duration of the incremental read delays could be established by conventional testing methods that account for the data sector delay periods and variances in the given magnetic disk storage system.

When data is written to a given data sector, the table would be entered with the read/write head number, cylinder number, time reference, and data sector to specify the phase lock oscillation field length for that data sector. When the data is subsequently read from the given data sector, the table would again be entered with the read/write head number, cylinder number, time reference, and data sector to specify the incremental read delay duration for that data sector. One skilled in the art can appreciate variations and equivalents to the table that fall within the scope of the invention.

Figure 5:
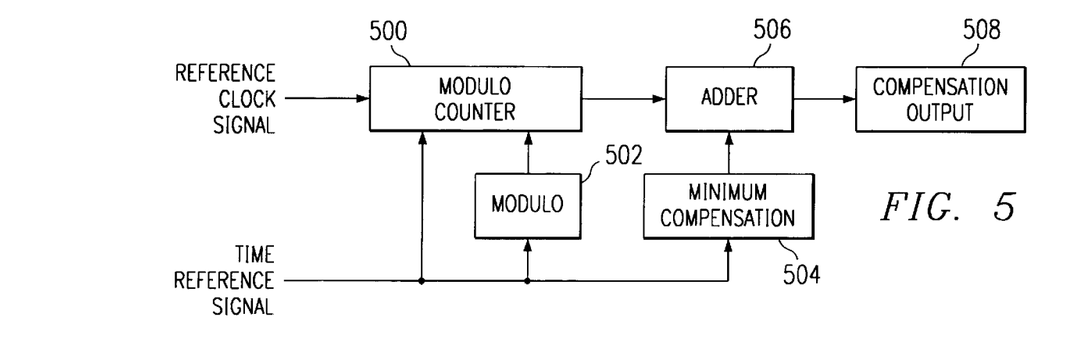
FIG. 5 illustrates a logic circuit for use in some embodiments of the invention.

A Logical Circuit Implementation—FIG. 5

FIG. 5 illustrates a logical circuit that could be used to implement some embodiments of the invention. The logic circuit could be implemented within the logic circuitry of the hard disk controller in the magnetic disk storage system. Shown are the modulo counter 500, the modulo constant register 502, the minimum compensation register 504, the adder 506, and the compensation output register 508. A time reference signal would be provided to the modulo counter 500, the modulo constant register 502, and the minimum compensation register 504. When the time reference is detected, the time reference signal would cause: 1) the modulo counter 500 to clear, 2) the modulo constant register 502 to provide the modulo constant to the modulo counter 500, and 3) the minimum compensation register 504 to provide the minimum compensation constant to the adder 506. After the modulo counter is cleared by the time reference signal, it would count the pulses of the reference clock signal according to the modulo constant and provide the output to the adder 506. For example, if the modulo constant is 100, the modulo counter 500 would provide an output to the adder 506 for every 100 pulses of the reference clock signal. The adder 506 would add to the output of the modulo counter 500 to the minimum compensation constant. The adder 506 would provide the total compensation to the compensation output register 508 for use by the magnetic disk storage system.

By selecting the appropriate reference clock signal and constants, one skilled in the art can appreciate that the compensation output increases as the data sector delay period increases. When a new time reference is detected, the compensation output register 508 begins to increase from the minimum compensation constant as time passes. The logical circuit could be used to provide either phase lock oscillator field length or to provide incremental read delays. The appropriate reference clock signal and constants could be established by conventional testing methods that account for data sector delay periods and the variances in the given magnetic disk storage system. Use of such a logic circuit minimizes the amount of microprocessor capacity required to implement the invention. One skilled in the art can appreciate variations and equivalents to the logic circuit that fall within the scope of the invention.

Figure 6:
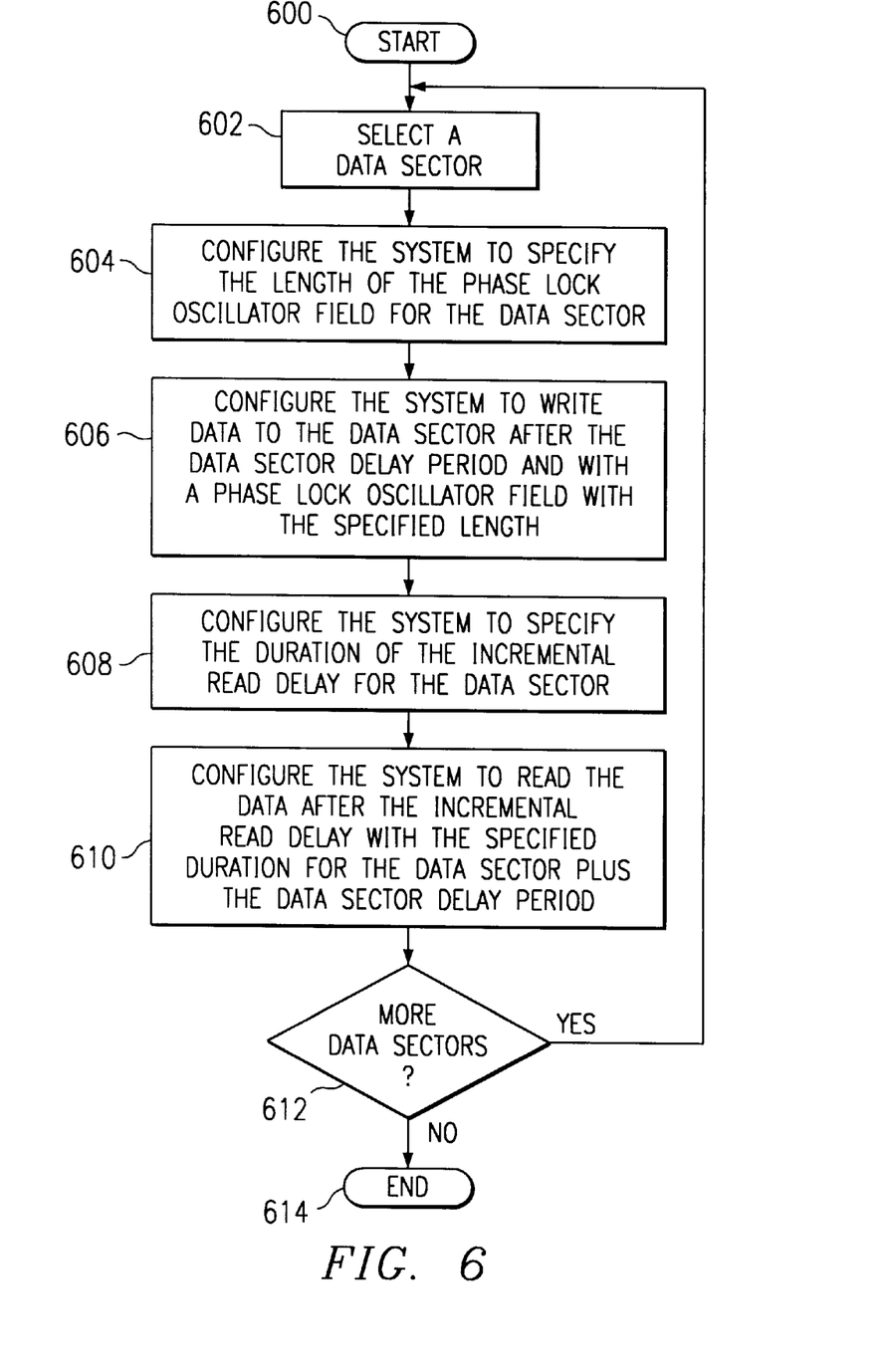
FIG. 6 illustrates a flow diagram for configuring the magnetic disk storage system in some embodiments of the invention.

Configuration Method—FIG. 6

FIG. 6 illustrates a method for configuring a magnetic disk storage system in accord with some embodiments of the present invention. The method starts at step 600 and proceeds to step 602 where a data sector is selected. The method then proceeds to step 604 where the system is configured to specify the length of the phase lock oscillator field for the data sector. This could accomplished be based on the duration of the data sector delay period and on the incremental read delay. This might also include configuring the system with a memory that associates the data sector with information incorporating the length of the phase lock oscillator field. The method then proceeds to step 606 where the system is configured to write data to the data sector after the data sector delay period and with a phase lock oscillator field with the specified length.

The method then proceeds to step 608 where the system is configured to specify the duration of the incremental read delay for the data sector. This could be based on the duration of the data sector delay period, the splice transient, and variances in the system. This might also include configuring the system with a memory that associates the data sector with information incorporating the duration of the incremental read delay. The method then proceeds to step 610 where the system is configured to read the data after the incremental read delay with the specified duration for the data sector plus the data sector delay period. The method then proceeds to step 610 where it is determined if there are more data sectors at step 612. If yes, then the method proceeds back to step 602. If not, the method ends at step 614.

The invention provides for fast and reliable read operations by compensating for variances that are experienced with magnetic disk storage systems. The invention significantly reduces the wasted memory space that is caused by compensation techniques that are applied uniformly to all data sectors in a transfer. The invention utilizes incremental read delays and/or phase lock oscillator fields that are sized appropriately for a given data sector.

It is to be expressly understood that the claimed invention is not to be limited to the description of the preferred embodiment but encompasses other modifications and alterations within the scope and spirit of the inventive concept.

What is claimed is:

1. A magnetic disk storage system that comprises at least one data sector on a magnetic disk device, wherein the system comprises:

a control means for specifying a length of a phase lock oscillator field for the data sector based on a data sector delay period for the data sector; and a writing means for writing a set of data to the data sector, wherein the set of data includes the phase lock oscillator field having the length specified by the control means.

2. The system of claim 1 wherein the system comprises multiple data sectors on the magnetic disk and wherein the control means specifies each individual length of each individual phase lock oscillator field for each individual data sector based on a data sector delay period for the individual data sector.

3. The system of claim 1 wherein the control means is further for specifying a duration of an incremental read delay for the data sector based on the data sector delay period for the data sector, and wherein the system further comprises:

a reading means for reading the set of data from the data sector after the incremental read delay plus the data sector delay period, wherein the incremental read delay has the duration specified by the control means.

4. The system of claim 3 wherein the system comprises multiple data sectors on the magnetic disk and wherein the control means specifies each individual duration of each individual incremental read delay for each individual data sector based on a data sector delay period for the individual data sector.

5. The system of claim 3 wherein the data sector delay period is a time period from when the system detects a timing reference on the magnetic disk device until the magnetic disk device is positioned to write to the data sector.

6. The system of claim 3 wherein the control means is incorporated into a logic circuit in a hard disk controller.

7. The system of claim 3 wherein the control means comprises a memory that associates the data sector with information incorporating the length of the phase lock oscillator field for the data sector and with information incorporating the duration of the incremental read delay for the data sector.

8. The system of claim 7 wherein the memory is comprised of registers.

9. The system of claim 7 wherein the memory is a first-in/first-out memory.

10. The system of claim 7 wherein the memory is on the magnetic disk device.

11. The system of claim 3 wherein the timing reference is a servo timing mark.

12. The system of claim 3 wherein the control means is further for specifying the length of the phase lock oscillator field and the duration of the incremental read delay based on a variance in the system.

13. The system of claim 12 wherein the variance comprises a variance in magnetic disk device spin speed.

14. The system of claim 12 wherein the variance comprises a variance in timing clock frequency.

15. The system of claim 12 wherein the variance comprises a variance in detection of the a timing reference versus a timing clock phase.

16. A method for configuring a magnetic disk storage system that has at least one data sector, the method comprising:

configuring the system to specify a length of a phase lock oscillator field for the data sector based on a data sector delay period for the data sector; and configuring the system to write a set of data to the data sector, wherein the set of data includes the phase lock oscillator field having the length specified by the control means.

17. The method of claim 16 wherein the system comprises multiple data sectors on the magnetic disk and further comprising configuring the system to specify each individual length of each individual phase lock oscillator field for each individual data sector based on a data sector delay period for the individual data sector.

18. The method of claim 16 further comprising configuring the system to specify a duration of an incremental read delay for the data sector based on the data sector delay period for the data sector, and to read the set of data from the data sector after the incremental read delay plus the data sector delay period, wherein the incremental read delay has the duration specified by the control means.

19. The method of claim 18 wherein the system comprises multiple data sectors on the magnetic disk and further comprising configuring the system to specify each individual duration of each individual incremental read delay field for each individual data sector based on the data sector delay period for the individual data sector.

20. The method of claim 18 further comprising configuring a logic circuit in a hard disk controller in the system.

21. The method of claim 18 further comprising configuring the system with a memory that associates the data sector with information incorporating the length of the phase lock oscillator field for the data sector and with information incorporating the duration of the incremental read delay for the data sector.

22. The method of claim 18 further comprising configuring the system to specify the length of the phase lock oscillator field and the duration of the incremental read delay based on a variance in the system.

23. The method of claim 22 wherein the variance comprises a variance in magnetic disk device spin speed.

24. The method of claim 22 wherein the variance comprises a variance in timing clock frequency.

25. The method of claim 22 wherein the variance comprises a variance in detection of the a timing reference versus a timing clock phase.

* * * * *

UNITED STATES PATENT AND TRADEMARK OFFICE
CERTIFICATE OF CORRECTION

| | | |
|---|---|---|
| PATENT NO. | : 6,072,650 | Page 1 of 1 |
| APPLICATION NO. | : 08/939063 | |
| DATED | : November 22, 2000 | |
| INVENTOR(S) | : Aaron Wade Wilson | |

It is certified that error appears in the above-identified patent and that said Letters Patent is hereby corrected as shown below:

On Title Page Item (22), i.e., the filing date section, please replace "Sep. 19, 2002" with --Jun. 6, 2002--.

Signed and Sealed this

Twenty-seventh Day of March, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,072,650 |
| APPLICATION NO. | : 08/939063 |
| DATED | : June 6, 2000 |
| INVENTOR(S) | : Aaron Wade Wilson |

It is certified that error appears in the above-identified patent and that said Letters Patent is hereby corrected as shown below:

On Title Page Item (22), i.e., the filing date section, please replace "Sep. 19, 2002" with --Jun. 6, 2002--.

This certificate supersedes Certificate of Correction issued March 27, 2007.

Signed and Sealed this

First Day of May, 2007

JON W. DUDAS
*Director of the United States Patent and Trademark Office*